United States Patent
Bullock

(10) Patent No.: US 11,675,353 B2
(45) Date of Patent: Jun. 13, 2023

(54) SYSTEM AND METHOD FOR DISRUPTING RADIO FREQUENCY COMMUNICATIONS OF AIRCRAFT

(71) Applicant: Enterprise Control Systems Ltd, Wappenham (GB)

(72) Inventor: Colin Bullock, Wappenham (GB)

(73) Assignee: ENTERPRISE CONTROL SYSTEMS LTD.

(*) Notice: Subject to any disclaimer, the term of this patent is extended or adjusted under 35 U.S.C. 154(b) by 306 days.

(21) Appl. No.: 16/894,145

(22) Filed: Jun. 5, 2020

(65) Prior Publication Data

US 2020/0301426 A1 Sep. 24, 2020

Related U.S. Application Data

(63) Continuation of application No. PCT/GB2018/053578, filed on Dec. 10, 2018.

(30) Foreign Application Priority Data

Dec. 8, 2017 (GB) .................................... 1720487

(51) Int. Cl.
*G05D 1/00* (2006.01)
*H04B 7/06* (2006.01)
(Continued)

(52) U.S. Cl.
CPC ......... *G05D 1/0094* (2013.01); *B64C 39/024* (2013.01); *G05D 1/104* (2013.01);
(Continued)

(58) Field of Classification Search
CPC .... G05D 1/0094; G05D 1/104; B64C 39/024; B64C 2201/122; H04B 7/0617; H04B 7/10; B64U 2101/20
See application file for complete search history.

(56) References Cited

U.S. PATENT DOCUMENTS 9,787,425 B1 * 10/2017 Gonzalez ................. H04K 3/45
9,847,034 B1 * 12/2017 Plawecki ............. G08G 5/0039
(Continued)

FOREIGN PATENT DOCUMENTS

GB 2536043 A 9/2016
GB 2546438 A 7/2017

OTHER PUBLICATIONS

International Search Report and Written Opinion dated Mar. 21, 2019 for PCT Application No. PCT/GB2018/053578.
(Continued)

*Primary Examiner* — John J Lee
(74) *Attorney, Agent, or Firm* — Husch Blackwell LLP

(57) ABSTRACT

A system for disrupting Radio Frequency communication of a plurality of unmanned aircraft. The system comprises: a directional antenna; a transmitter; a drive system connected to the directional antenna and configured to move the directional antenna; and a control system. The control system causes the transmitter to generate a signal waveform configured to disrupt Radio Frequency communication of an unmanned aircraft for emission by the directional antenna, and causes the drive system to move the directional antenna such that each of the plurality of unmanned aircraft is irradiated intermittently by the emitted radiation. Each of the plurality of unmanned aircraft is irradiated for a first period of time and not irradiated for a second period of time, the second period of time is less than or equal to 5 seconds.

17 Claims, 12 Drawing Sheets

(51) Int. Cl.
*B64C 39/02* (2023.01)
*G05D 1/10* (2006.01)
*H04B 7/10* (2017.01)
*B64U 101/20* (2023.01)

(52) U.S. Cl.
CPC ............ *H04B 7/0617* (2013.01); *H04B 7/10* (2013.01); *B64U 2101/20* (2023.01)

(56) References Cited

U.S. PATENT DOCUMENTS

2014/0147116 A1* 5/2014 Krupkin ................. F41G 7/224
 398/39
2017/0179592 A1 6/2017 Anderson
2017/0192089 A1* 7/2017 Parker .................... F41H 11/02

OTHER PUBLICATIONS

Stahlberg: Radio jamming attacks against two popular mobile networks; Helsinki University of Technology HUT TML Jan. 2000.
European Examination report dated Mar. 30, 2022 for European Application No. 18836607.4.

* cited by examiner

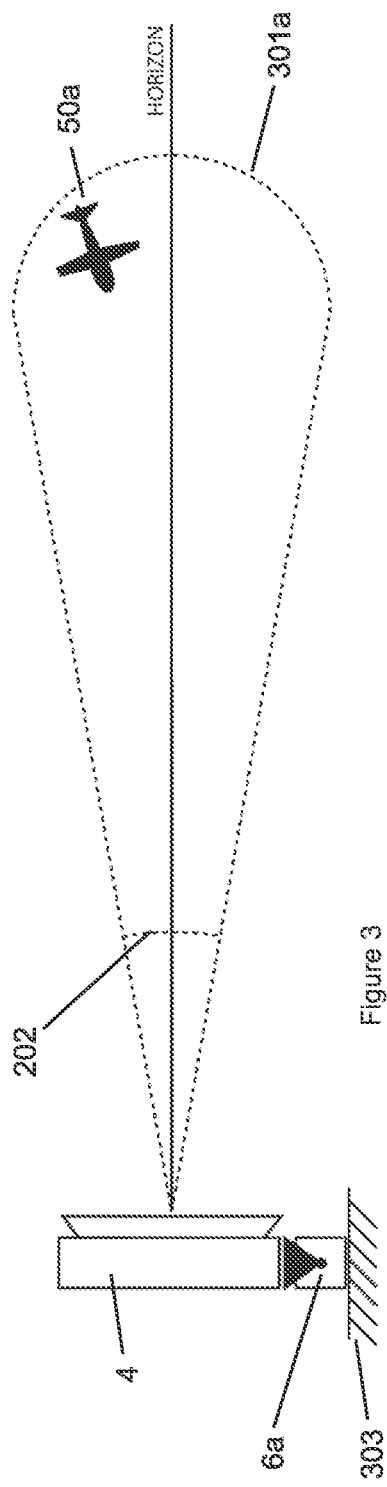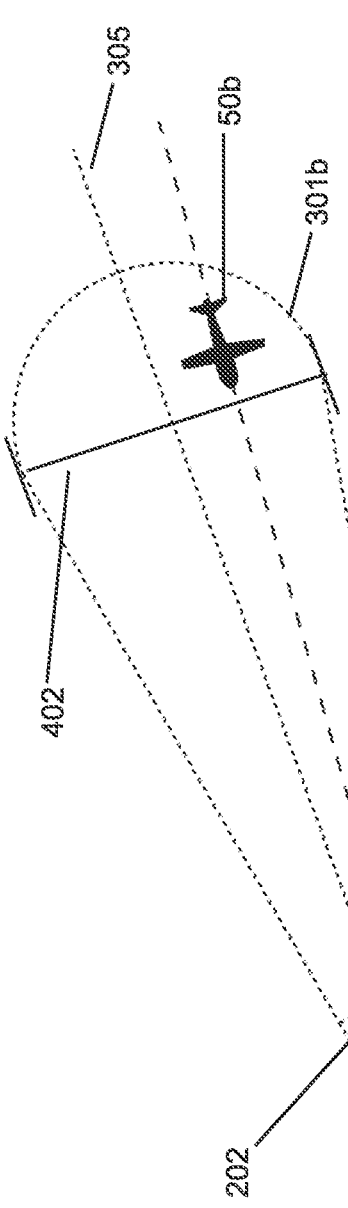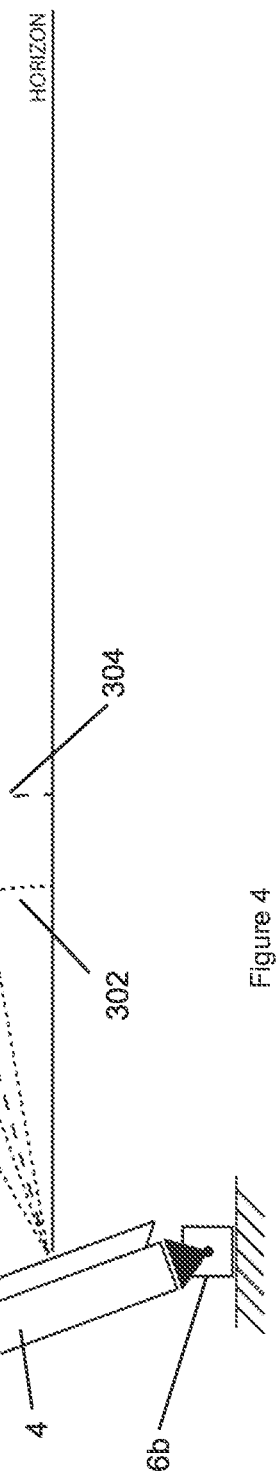

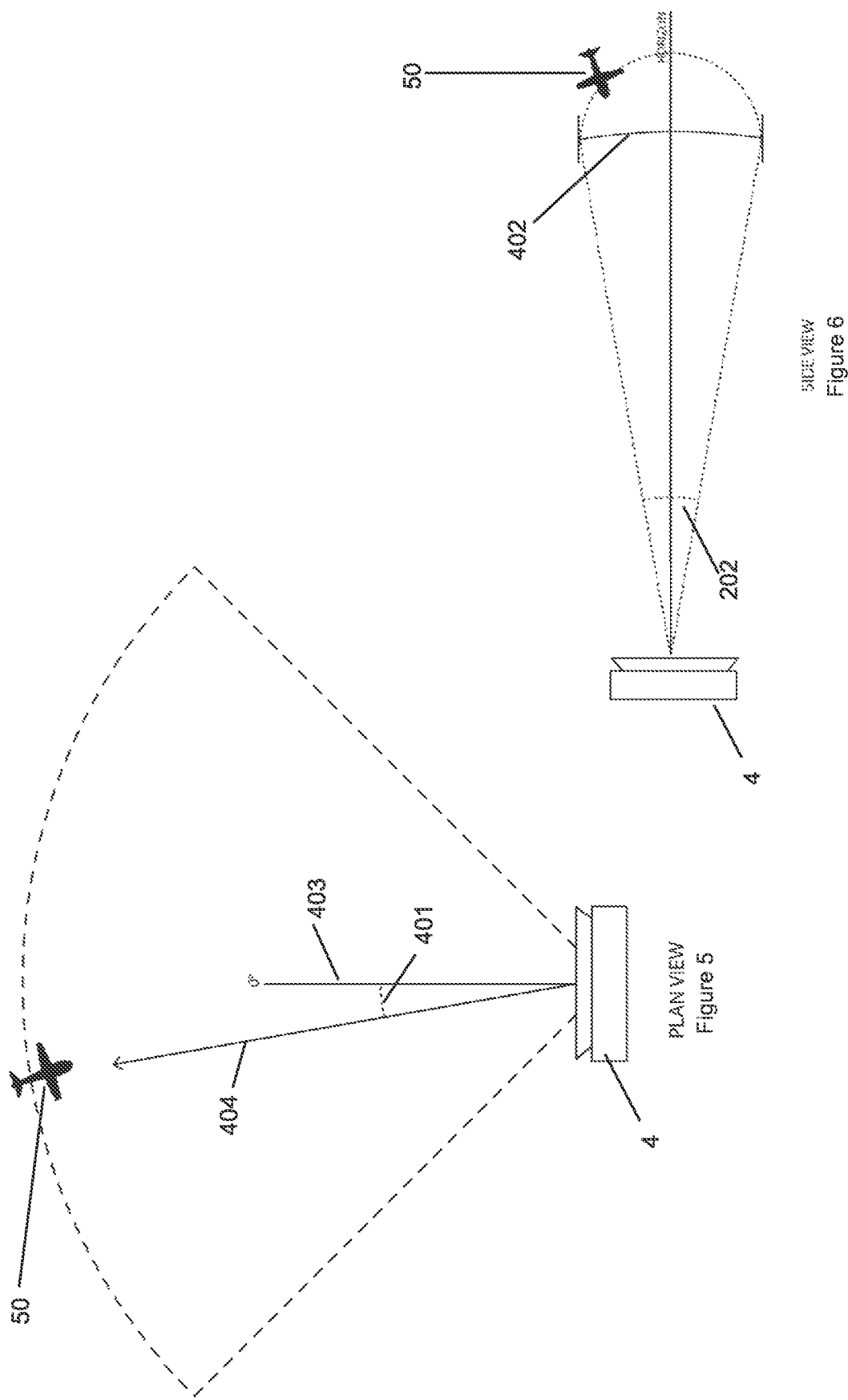

SYSTEM AND METHOD FOR DISRUPTING RADIO FREQUENCY COMMUNICATIONS OF AIRCRAFT

CROSS-REFERENCE TO RELATED APPLICATIONS

This application is a continuation of International Application No. PCT/GB2018/053578, filed Dec. 10, 2018, which claims priority to GB Application No. 1720487.6, filed Dec. 8, 2017, under 35 U.S.C. § 119(a). Each of the above-referenced patent applications is incorporated by reference in its entirety.

BACKGROUND OF THE INVENTION

Technical Field

The present invention relates to a system and method for disrupting Radio Frequency (RF) communications of an aircraft, such as an unmanned aircraft.

Background

There has been a rise in the use of unmanned aircraft, sometimes referred to as "drones", "unmanned aerial vehicles" (UAV), or "unmanned aircraft systems" (UAS), over recent years.

Unmanned aircraft may be used for undesirable purposes, for example unauthorised filming/photography and encroaching into commercial airspace causing a potential danger to other air traffic. Unmanned aircraft may also be adapted for malicious purposes, including smuggling and terrorism.

The AUDS® system commercially available from Blighter Surveillance Systems Ltd, UK, Chess Dynamics Ltd, UK and Enterprise Control Systems Ltd, UK provides a counter-UAS system which can detect and defeat a single unmanned aircraft in 10 to 15 seconds.

SUMMARY

According to a first embodiment of the present invention, there is provided a system for disrupting Radio Frequency communication of a plurality of unmanned aircraft, the system comprising:
 a directional antenna;
 a transmitter to generate a signal waveform for emission by the directional antenna, the signal waveform configured to disrupt Radio Frequency communication of an unmanned aircraft;
 a drive system connected to the directional antenna and configured to move the directional antenna; and
 a control system operatively connected to the transmitter and the drive system;
 wherein the control system is configured to:
 cause the transmitter to generate the signal waveform; and
 cause the drive system to move the directional antenna such that electromagnetic radiation emitted by the directional antenna irradiates each of the plurality of unmanned aircraft intermittently, wherein each of the plurality of unmanned aircraft is irradiated for a first period of time and not irradiated for a second period of time, and wherein the second period of time is less than or equal to 5 seconds.

According to another embodiment of the invention, there is provided a method of disrupting a radio frequency communication system of one or more unmanned aircraft using a same source of electromagnetic radiation, the method comprising:
 irradiating each of the one or more unmanned aircraft with a burst of electromagnetic radiation using a same source of electromagnetic radiation; and
 repeating the irradiating the each of the unmanned aircraft with a burst of electromagnetic radiation such that all of the one or more unmanned aircraft are irradiated at least once every 5 seconds.

According to a further embodiment of the invention, there is provided a non-transitory computer-readable medium comprising computer-readable instructions for execution by a processor of a system for disrupting radio frequency communication of unmanned aircraft, the system comprising: a directional antenna; a transmitter to generate a signal waveform for emission by the directional antenna; and a drive system connected to the directional antenna and configured to move the directional antenna; wherein the computing readable instructions, when executed by the processor, cause the processor to:
 cause the transmitter to generate the signal waveform, the signal waveform configured to disrupt radio frequency communication of an unmanned aircraft; and
 cause the drive system to move the directional antenna such that electromagnetic radiation emitted by the directional antenna irradiates each of a plurality of unmanned aircraft intermittently, wherein each of the plurality of unmanned aircraft is irradiated for a first period of time and not irradiated for a second period of time, and wherein the second period of time is less than or equal to 5 seconds.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 3 and 4 are diagrammatic representations showing the use of a radar tilting unit to adjust an elevation angle of a radar;

FIG. 5 is a diagrammatic representation of a plan view of a radar system;

FIG. 6 is a diagrammatic representation of a side view of a radar system;

DETAILED DESCRIPTION OF CERTAIN INVENTIVE EMBODIMENTS

Figure 13:
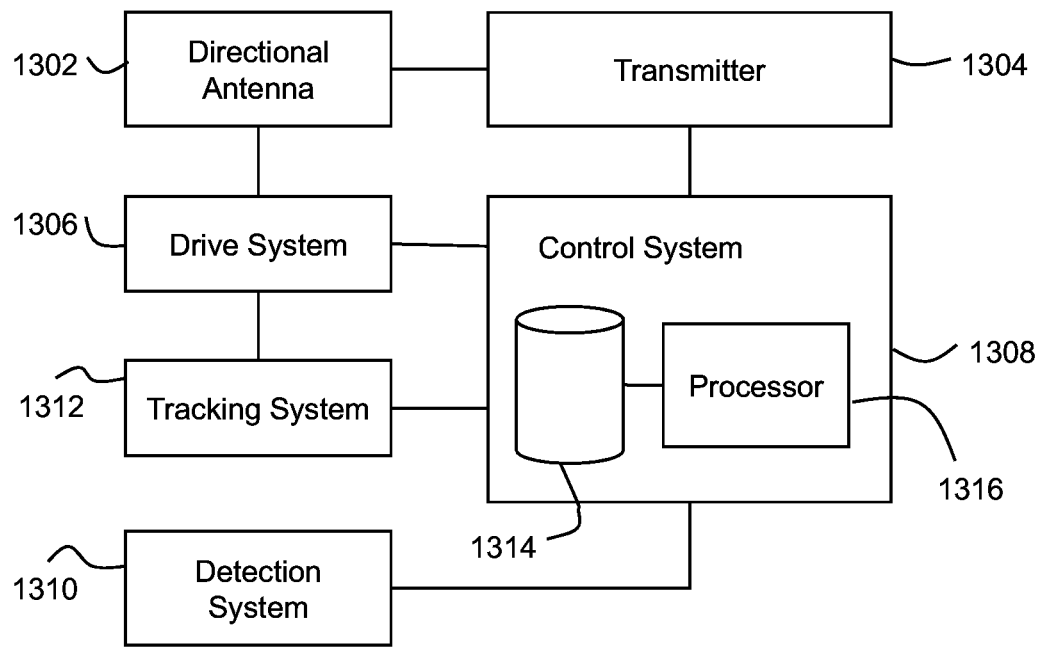
FIG. 13 is a diagrammatic representation of a logical block diagram of a system for disrupting RF communication according to an example.

In a first example, a system for disrupting Radio Frequency communication of a plurality of unmanned aircraft is provided. A diagrammatic representation of the system is depicted in FIG. 13. The system comprises: a directional antenna 1302; a transmitter 1304 to generate a signal waveform for emission by the directional antenna, the signal waveform configured to disrupt Radio Frequency communication of an unmanned aircraft; a drive system 1306 connected to the directional antenna and configured to move the directional antenna; and a control system 1308 operatively connected to the transmitter and the drive system. The control system 1308 is configured to: cause the transmitter 1304 to generate the signal waveform; and cause the drive system 1306 to move the directional antenna such that electromagnetic radiation emitted by the directional antenna 1302 irradiates each of the plurality of unmanned aircraft intermittently, such that each of the plurality of unmanned aircraft is irradiated for a first period of time and not irradiated for a second period of time, and wherein the second period of time is less than or equal to 5 seconds.

With such a system the period between any of the plurality of aircraft being irradiated with the signal waveform is less than or equal to 5 seconds. It has been found that some radio communication systems in an unmanned aircraft take 5 seconds or longer to recover having been disrupted by the electromagnetic radiation emitted by the directional antenna. Such a communication system may be disabled by ensuring that the period of time between irradiation by a disruptive, or jamming, signal is less than the recovery time. Thus, the system can use the same directional antenna and transmitter to disrupt communications of a plurality of unmanned aircraft at the same time. With such a system, an unmanned aircraft does not need to be irradiated continuously to ensure that its radio frequency communication is disrupted. Thus, a single system may be more effective against a "swarm" of unmanned aircraft; rather than target and disrupt communications from a single unmanned aircraft, at least two unmanned aircraft can have their communications disrupted substantially at the same time by the single system.

In some examples the system is configured to disrupt the communications of an unmanned aircraft which has a maximum gross take off weight of less than 10 kg, a normal operating altitude of less than about 370 m, and/or a maximum airspeed of less than 100 knots. Such unmanned aircraft fall within the Group 1 classification of unmanned aerial systems defined by the U.S. Department of Defense. Unmanned aircraft meeting these characteristics are available for purchase from retail outlets, and may be used for undesirable purposes or adapted for malicious purposes. In other examples, the system is configured to disrupt the communications of unmanned aircraft with other performance characteristics. For example, the system may be configured to disrupt the communications of an unmanned aircraft falling into other groups as defined by the U.S. Department of Defense, such as groups 2, 3, 4 and/or 5.

The first period of time and the second period of time may vary. In other words, the duty cycle between the first period of time and the second period of time need not be constant. Reference to "intermittently" is used to refer to both regular and irregular intervals.

The directional antenna 1302 may comprise at least two elements, each aligned in the same direction. For example, the directional antenna may comprise an element optimised for a first frequency of operation and an element optimised for a second frequency of operation, different from the first frequency of operation.

The drive system 1306 may have one degree of freedom, two degrees of freedom, or three or more degrees of freedom. For example, a drive system with two degrees of freedom may provide azimuth adjustment around an axis, which may be a vertical axis, and altitude adjustment to adjust the angle subtended by a boresight of the directional antenna with the axis.

The electromagnetic radiation emitted may comprise a GNSS frequency. GNSS may form part of the navigation and positioning system for an unmanned aircraft. GNSS systems are typically relatively slow to re-acquire signals with the GNSS satellites once communication has been disrupted, taking at least 5 seconds to re-acquire the signal. Example GNSS frequencies include L-band frequencies, such as 1164 MHz to 1610 MHz.

The electromagnetic radiation emitted may comprise an ISM frequency and the second period of time is less than or equal to 0.5 seconds. ISM frequencies, for example include 902-928 MHz, 2.4-2.5 GHz, 5.725-5.875 GHz and 24-24.25 GHz. Command and control of unmanned aircraft may use ISM frequencies. These systems are typically faster to recover following disruption than GNSS frequencies, possibly re-acquiring the signal after 0.5 seconds, so the periods without irradiation may be shorter.

Examples may use several different ways of controlling the drive system 1306 to irradiate a plurality of unmanned aircraft intermittently. For example, the drive system 1306 may sweep over a predetermined area continuously, such as back and forth or rotating around an axis, as well as more complex patterns, such as covering open airspace between buildings.

The drive system 1306 may be configured to move the directional antenna about an axis. The axis may be a vertical axis, or an axis offset from vertical, depending on the area over which the directional antenna is desired to emit radiation. The drive system 1306 may be configured to rotate the directional antenna about the axis continuously in a same rotational direction. This may allow an area to be covered without experiencing large forces on the drive system, for example the rotational momentum will assist the rotation. The drive system 1306 may be configured to rotate the directional antenna about the axis at a speed of at least 1 rad/s, this may ensure that all unmanned aircraft within the area swept by radiation emitted from the directional antenna do not experience more than 5 seconds without being irradiated. The drive system 1306 may be configured to rotate the directional antenna about the axis at a speed of at least 10 rad/s, this may ensure that all unmanned aircraft within the area swept by radiation emitted by the directional antenna do not experience more than 0.5 seconds without being irradiated.

The system may further comprise a detection system 1310 configured to detect unmanned aircraft, with the control system 1308 configured to cause the drive system 1306 to move a beam emitted by the directional antenna over an area including at least two unmanned aircraft detected by the detection system. Thus, the detection system 1310 may be used to control the movement of the drive system, to sweep the beam of the directional antenna only over an area which includes detected unmanned aircraft. The detection system 1310 may be a radar system.

In some examples, the detection system 1310 may be for identifying a particular type of unmanned aircraft, and wherein the control system is configured to cause the transmitter to generate a signal waveform based on the particular type of unmanned aircraft. In this way, known types of unmanned aircraft may be irradiated with signals predetermined to be effective at disrupting their communication systems.

The control system 1308 may be configured to vary the speed at which the drive system 1306 moves the directional antenna 1302 in dependence on detected unmanned aircraft within a beam of electromagnetic radiation emitted by the directional antenna. This may help increase the time that electromagnetic radiation emitted by the directional antenna 1302 is incident on an unmanned aircraft.

For example, the control system 1308 may be configured to cause the drive system 1306 to decrease the speed at which the directional antenna 1302 moves when an unmanned aircraft is detected within the beam of electromagnetic radiation emitted by the directional antenna. This may increase the time over which an unmanned aircraft's radio frequency communications are disrupted.

For example, the control system 1308 may be configured to cause the drive system 1306 to increase the speed at which the directional antenna 1302 moves when no unmanned aircraft is detected within the beam of electromagnetic radiation emitted by the directional antenna 1302. This may reduce the periods during which unmanned aircraft are not irradiated by electromagnetic radiation, giving the aircraft's communication systems less time to recover.

The system may further comprise a tracking system 1312 operatively connected to the drive system 1306 and the control system 1308, the tracking system 1312 for tracking an unmanned aircraft detected by the detection system 1310. The control system 1308 may then be configured to: cause the tracking system 1312 to track a single unmanned aircraft, responsive to a single unmanned aircraft being detected by the detection system 1310; and cause the drive system to move a beam of electromagnetic radiation emitted by the directional antenna across an area including at least two unmanned aircraft, responsive to two or more unmanned aircraft being detected by the detection system 1310. In this way, the system may defeat single unmanned aircraft by tracking them, and only switch to the moving mode of operation when required.

Figure 14:
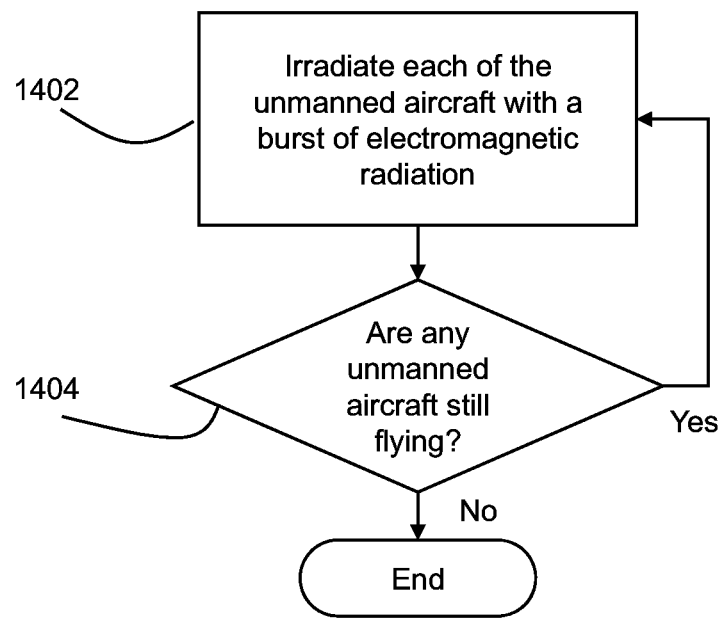
FIG. 14 is a flow diagram of a method of disrupting the RF communication of a plurality of unmanned aircraft.

In another example, a method of disrupting a radio frequency communication system of one or more unmanned aircraft using a same source of electromagnetic radiation is provided. The example method is depicted in FIG. 14. The method comprises: irradiating each of the one or more unmanned aircraft with a burst of electromagnetic radiation using a same source of electromagnetic radiation at step 1402; and repeating the irradiating the each of the unmanned aircraft with a burst of electromagnetic radiation such that all of the one or more unmanned aircraft are irradiated at least one every 5 seconds.

A same source of electromagnetic radiation may comprise a single frequency or a range of frequencies and could be emitted by a single antenna or two or more antennas. When two or more antennas are used, the boresight of the antennas may be parallel to each other or otherwise aligned.

The burst of electromagnetic radiation may comprise a GNSS frequency.

The burst of electromagnetic radiation may comprise an ISM frequency, and the irradiating is repeated such that all of the one or more unmanned aircraft are irradiated at least once every 0.5 seconds.

The irradiating and repeating may be responsive to detection of one or more unmanned aircraft, for example the irradiating may be repeated dependent on a determination at step 1404 that unmanned aircraft are still flying. Such a determination may be made by a detection system and/or a tracking system.

The irradiating and repeating may be carried out under the control of a control system. For example, a control system may control a timing of the burst of electromagnetic radiation and/or may control movement of the source of electromagnetic magnetic radiation so that it moves over an unmanned aircraft, creating the effect of a burst of electromagnetic radiation.

Referring again to FIG. 13, in another example, a computer-readable medium 1314, such as a non-transitory computer readable medium, comprises computer-readable instructions for execution by a processor 1316 of a system for disrupting radio frequency communication of unmanned aircraft. As discussed above, the system comprises: a directional antenna 1302; a transmitter 1304 to generate a signal waveform for emission by the directional antenna; and a drive system 1306 connected to the directional antenna and configured to move the directional antenna. The computer readable instructions, when executed by the processor 1316, cause the processor 1316 to: cause the transmitter 1304 to generate the signal waveform, the signal waveform configured to disrupt Radio Frequency communication of an unmanned aircraft; and cause the drive system 1306 to move the directional antenna such that electromagnetic radiation emitted by the directional antenna 1302 irradiates each of the plurality of unmanned aircraft intermittently, such that each of the plurality of unmanned aircraft is irradiated for a first period of time and not irradiated for a second period of time, and wherein the second period of time is less than or equal to 5 seconds.

The computer-readable instructions, when executed by the processor 1316, may cause the processor to: cause the transmitter 1304 to generate the signal waveform comprising an ISM frequency; and cause the drive system 1306 to move the directional antenna 1302 such that the second period of time is less than or equal to 0.5 seconds.

The computer-readable instructions, when executed by the processor 1308, may cause the processor 1308 to: cause the drive system 1306 to rotate the directional antenna about an axis continuously in a same rotational direction.

The computer-readable instructions, when executed by the processor 1308, may cause the processor 1308 to: cause the drive system 1306 to vary the speed at which the directional antenna 1302 moves in dependence on detected unmanned aircraft within a beam of electromagnetic radiation emitted by the directional antenna 1302.

The computer-readable instructions, when executed by the processor 1308, may cause the processor to: cause the drive system 1306 to move the directional antenna 1302 at a first speed when an unmanned aircraft is detected within the beam of electromagnetic radiation emitted by the directional antenna 1302; and cause the drive system 1306 to move the directional antenna 1302 at a second speed when no unmanned aircraft is detected within the beam of electromagnetic radiation emitted by the directional antenna 1302, wherein the second speed is faster than the first speed.

Figure 1:
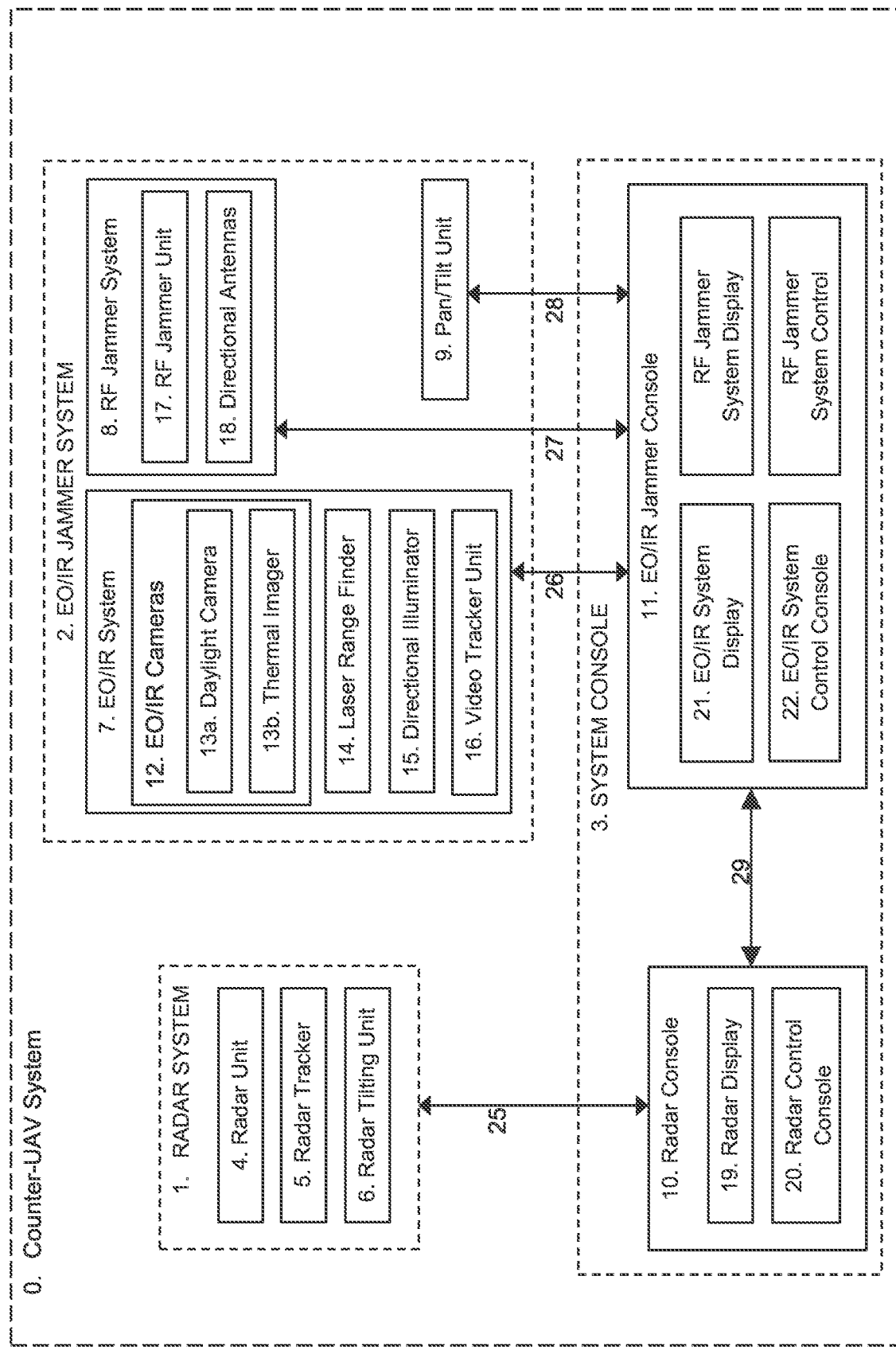
FIG. 1 is a diagrammatic representation of a logical block diagram of a counter-unmanned aircraft system according to an example.

FIG. 1 shows a logical block diagram of a counter-unmanned aircraft system according to another example. A radar system, or detection system, 1 is provided for detecting and radar-tracking unmanned aircraft (objects). The radar system 1 comprises a radar unit 4 mounted on a radar tilting unit 6 and a radar tracker 5 to form tracks on any objects that are repeatedly detected by the radar unit.

The object output of the radar unit and the commands to it are provided to a system console 3 and specifically the radar console 10, which provides both a radar display 19 and a control console 20 for the operator. Information about the object or objects being detected by both the radar system and Electro-Optic/Infrared (EO/IR) Jammer System 2 are shared between the radar console 10 and an EO/IR Jammer Console 11.

The EO/IR Jammer system 2 comprises a number of sensors and effectors. An EO/IR System 7 comprises a number of imaging devices, such as camera or thermal imager systems. This includes EO/IR cameras 12, for example a daylight camera 13a and a thermal imager 13b, that provide video channels to a video tracker unit 16, which is configured to detect and track one or more objects of interest on the video channels from both the daylight camera and thermal imager, either individually or simultaneously.

The EO/IR system 7 may also include a laser range finder 14, commonly abbreviated to LRF, and one or more directional illuminators 15, which can provide a directional visible light or infrared illumination beam to point in the same direction as the daylight camera and thermal imager systems, thus providing enhanced illumination of the object(s) when it is being video tracked.

The EO/IR jammer system 2 also includes a Radio Frequency (RF) Jammer system 8 that itself comprises a transmitter 17, also referred to as an RF jammer unit and one or more directional antennas 18.

Both the EO/IR system 7 and the RF jammer system 8 are mounted on a single drive system 9, also referred to as a pan/tilt unit, that arranged to alter the azimuth (pan) and elevation (tilt) position of the systems mounted on it. Alternatively, the EO/IR system could be mounted on one pan/tilt unit and the RF Jammer system mounted on a separate pan/tilt unit with both pan/tilt units connected to the EO/IR jammer console 11.

The EO/IR System 7, the RF jammer system 8 and pan/tilt unit 9 are all logically connected to the EO/IR jammer console 11 allowing video from the EO/IR cameras 12, object information, commands and controls to be sent between the EO/IR jammer system 2 and the EO/IR jammer console 11.

Within the EO/IR jammer console 11 an EO/IR system display 21 allows one or more video channels and status information from the EO/IR jammer system to be displayed. An EO/IR system control console 22 provides a user interface for the operator to view and control the system components within the EO/IR jammer system 2.

The Radar System 1, the EO/IR jammer system 2 and the system console 3 may all be installed remote from one another. For installations where the radar system 1, the EO/IR jammer system 2 and the system console 3 are separated by less than about 10 metres then individual discrete interfaces may be used to connect each of the components. A radar interface 25 may use a high speed serial interface, for example RS422, or Ethernet. An EO/IR system interface 26 may use an analog interface, such as coaxial or balanced differential cables, or a digital interface, such as HDMI, Display Port or DVI, for the video channels, and RS422 or RS485 for the control and information signals. An RF jammer interface 27 may use a RS422 or RS485 serial interface. A pan/tilt interface 28 may use a RS422 or RS485 serial interface. Other interfaces may also be used, for example Universal Serial Bus.

For installations where the radar system 1, the EO/IR jammer system 2 and the system console 3 are separated by greater than 10 metres then the system interfaces may be combined onto a common interface capable of supporting long range communications, for example Ethernet either over wire or fibre. Discrete electrical interfaces such as composite video, RS232, RS422 RS485 and other short range interface standards may be converted to Ethernet and back again using converter boxes. Ethernet can also be used for system installation of less than ten metres, but may increase the cost of the system.

Figure 2:
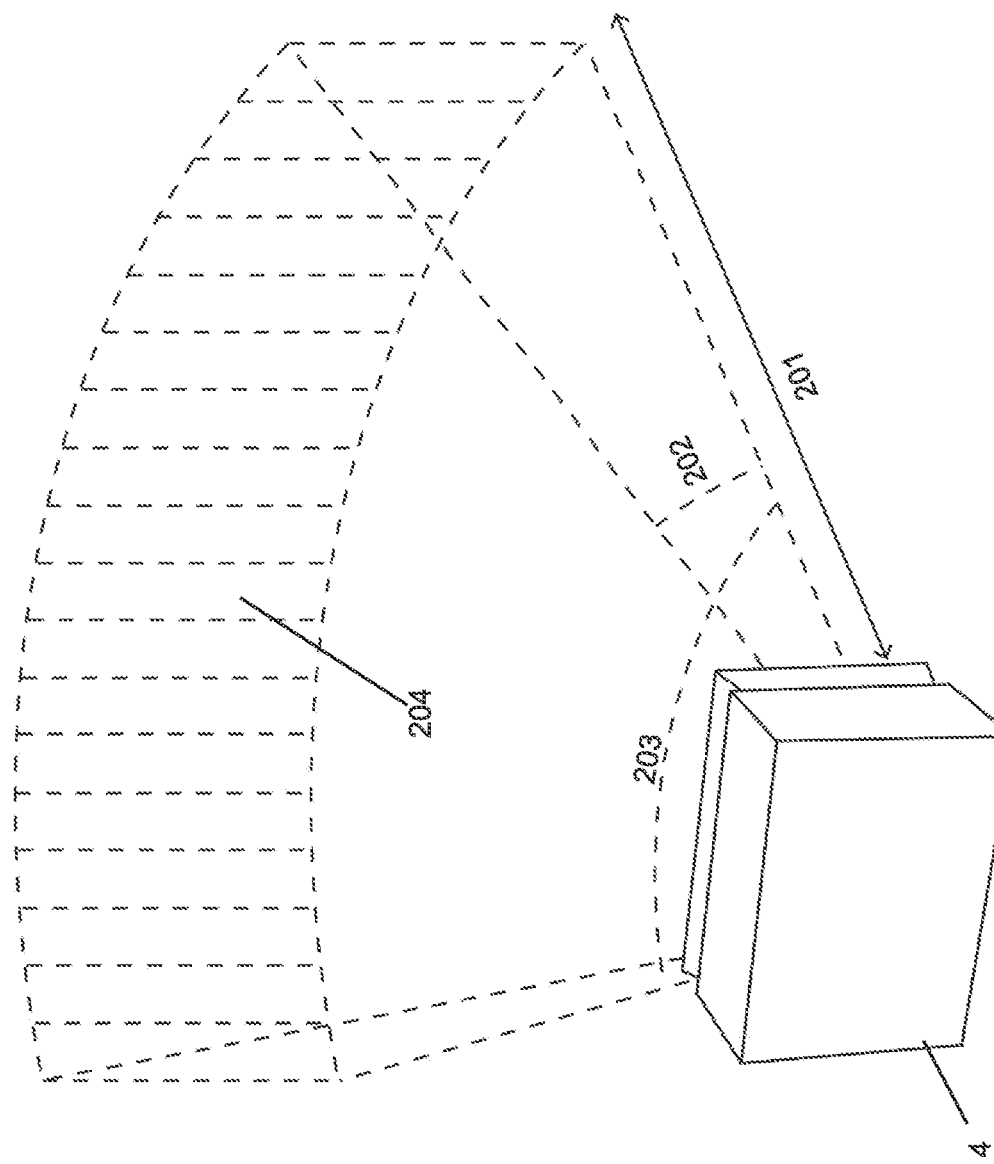
FIG. 2 is a diagrammatic representation of a non-rotating radar scanning a volume of sky.

With reference to FIG. 2, a non-rotating or electronic-scanning 2-Dimensional Doppler "Ground surveillance" radar 4 (for example the Blighter® B400 series radar commercially available from Blighter Surveillance Systems, www.blighter.com) is used to scan a volume of the sky searching for UAVs. Ground surveillance radars (GSR) are a class of radar that may be used to detect moving objects on the ground. Ground surveillance radars can detect ground based objects at ranges from 10 metres up to a maximum of 10 km, 20 km or 50 km, for example. Ground surveillance radars may measure object range 201 and position within the azimuth scan angle 203, but they have a fixed elevation beamwidth 202, and do not include the means to measure the object vertical offset or object height, so they can be considered to be two-dimensional (2D) radars. The azimuth/elevation cells 204 shown in FIG. 2 represent how the radar is able to finely measure azimuth position but only measure a single position in elevation. The physical size of ground surveillance radar antennas may be less than 1 m horizontally and less than 0.5 m vertically. A typical ground surveillance radar is described in European patent number EP1934627, herein incorporated by reference for all purposes.

Ground surveillance radars can employ Doppler frequency measurement allowing them to detect movement by virtue of the Doppler frequency shift of the reflected radar beam from moving objects. The Doppler frequency measurement also allows Ground Surveillance radars to filter out and remove significant amounts of radar signal power reflected from static objects on the ground including hills, static vegetation such as trees, buildings, and other fixed infrastructure, as described in U.S. Pat. No. 7,876,262, herein incorporated by reference for all purposes. The search volume of the ground surveillance radar is defined by the volume enclosed within the segment shape with sides formed by the range 201 of the radar, the azimuth scan angle 203 and the elevation beamwidth 202 of the radar unit 4.

Referring to FIGS. 3 and 4, the radar 4 may be mounted on a radar tilting unit 6a, 6b attached to a mounting structure 303 allowing the radar beam 301a, 301b to be adjusted in elevation angle 302 such that the radar can either search for low altitude UAVs 50a close to the ground, as can be seen in FIG. 3, or high altitude UAVs 50b flying in clear sky, as can be seen in FIG. 4. Referring specifically to FIG. 4, note how although FIG. 4 shows the UAV to be at a precise object elevation angle 304, the radar unit is not able to measure this angle. The most accurate measurement of elevation angle for UAV 50b that the radar unit can make is the radar tilt angle 302 plus or minus half of the elevation beamwidth 202, this is shown as the radar object elevation window 402. For example, if the radar tilt angle 302 is 15 degrees and the radar elevation beamwidth 202 is 20 degrees then that radar can only indicate that the UAV is in the radar object elevation window somewhere between +5 degrees and +25 degrees above the horizon. Note that the elevation boresight 305 is the chosen elevation reference point (zero degrees) for this radar unit, though any other reference point could be used.

The Doppler signal measurement capability of the radar unit allows static reflections from the ground (Ground clutter) to be effectively removed from the radar signal thereby allowing the small radar reflections from small sized UAVs to be detected by the radar. The use of a non-rotating Doppler ground surveillance radar provides advantages over traditional mechanically scanned radar systems including faster azimuth scanning and, in conjunction with Doppler signal processing, enhanced ground clutter discrimination and the ability to detect objects with very low radial velocity (as described in U.S. Pat. No. 7,876,262) with respect to the radar, e.g. Rotary wing UAVs. The radar can detect UAVs and measure their location in range and azimuth with respect to the radar boresight. The non-rotating Doppler ground surveillance radar described does not have the ability to measure the object elevation angle 304 of the UAV other than by an assumption that the UAV is probably within the main elevation beamwidth of the radar unit as previously described. The non-rotating Doppler ground surveillance radar can measure the instantaneous Doppler velocity of objects and the instantaneous Radar Cross Sectional area (RCS) of the UAV, both of these object characteristics being useful for the object classification process described later.

The radar system 1 may include a radar tracker 5 (for example the "SPx Tracking Server" commercially available from Cambridge Pixel Ltd. www.cambridgepixel.com) that allows tracks to be formed on sequences of individual detections of individual objects over a number of radar scan periods. For example, for a single UAV flying in a straight line and being detected by the radar on each radar scan (or object update period), over a period of seconds or tens of seconds then a sequence of radar detections each with changing range and azimuth measurements would be seen. The object tracker is able to associate the detections on each scan to create a track that follows the vector formed by the UAV's motion. Such a track can determine the relative ground speed and heading of the object based on the change of object position over a measured period of time. Use of object speed and heading is beneficial to the counter-UAV system as it allows the object location to be extrapolated from the previous and most recent positions to compensate for any radar system object measurement latency, for example due to signal processing delays.

Information determined by the radar unit and radar tracker concerning the object can include some or all of: range, azimuth, approximate elevation, radar cross sectional area (commonly referred to by the industry as RCS), Doppler velocity, ground speed and heading. This information, in part or whole, can be used to assess if the measured object has the characteristics of a UAV that is likely to be of interest and/or a threat.

Equally, the same information can also determine if the object is likely to be some other type of object including ground based objects; vehicles, people, wind-blown vegetation, air conditioning fans etc., or other air based objects including: birds or larger commercial aircraft. An object filter in the radar console 10 can apply rules based on the radar object information to exclude or include objects with specific characteristics. For example, a small winged UAV may never fly slower than 20 km/hr nor faster than 60 km/hr. A simple filter based on these speed limits could be used to indicate an object having a speed of, for example, 50 km/hr as being a small winged UAV. Equally, an object having a speed of 10 km/hr would be excluded by the rule allowing that object to be ignored. The radar system 1 and the radar console 10 are capable of detecting and then filtering many hundreds of possible objects per scan. This may reduce false alarms, thereby simplifying use of the counter-UAV system.

Referring again to FIG. 1, once an object has been detected by the radar system 1 and radar console 10 then that object information is passed to the EO/IR Jammer console 11 over the object interface 29. The information from the radar may either be sent in its original radar format and coordinate system or converted to a format suited to the EO/IR System. For example, the radar can either provide the object range and bearing with respect to the radar's own position, or convert it to be with respect to the EO/IR System's location, or alternatively convert it into an Earth referenced location, for example, latitude and longitude.

Referring to FIGS. 5 and 6, the radar unit 4 is capable of measuring object range 404 and azimuth position 401 with a high accuracy of within about 1% but can only provide a crude assessment of elevation angle based on the elevation beamwidth 202 and tilt angle (not shown) of the radar system. Note how the azimuth position 401 is shown with respect to the azimuth boresight angle 403 of the radar, the azimuth boresight being the chosen reference point (zero degrees) for this radar, though any other reference point could be used.

Figure 7:
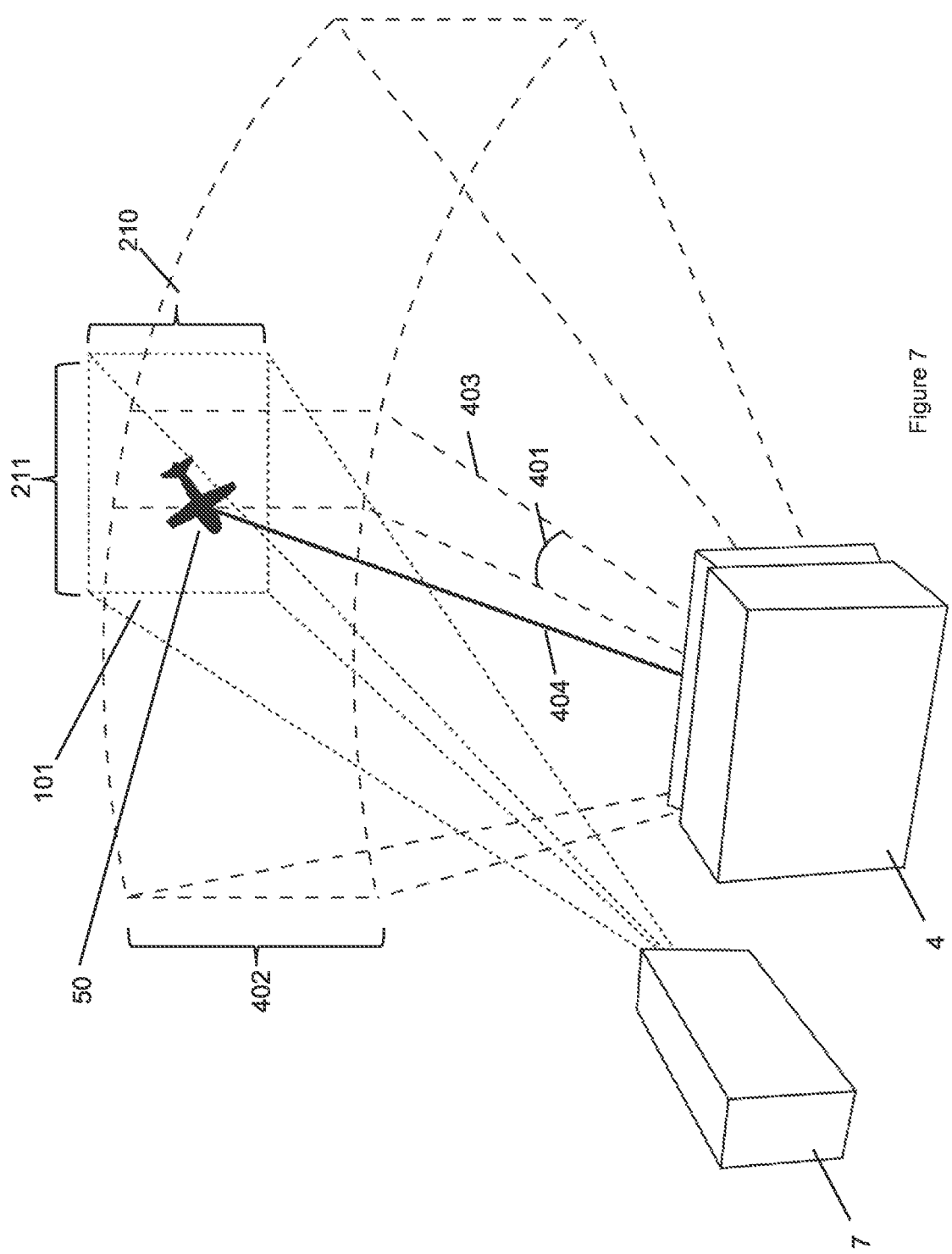
FIG. 7 is a diagrammatic representation of an imaging system and a radar system providing information of the same object.

Referring to FIG. 7, the EO/IR System 7 is capable of measuring object position within a video frame 101 with high accuracy of approximately one pixel (pixel element) in the horizontal field of view (HFOV) 211 and vertical field of view (VFOV) 210 but not in range 404 as the daylight camera 13a and thermal imager 13b contain no method of directly determining range. Both the radar unit 4 and the EO/IR system 7 can be considered to be 2D (two dimensional) sensor systems, but with only one common dimension, the azimuth angle. As the radar system cannot provide a sufficiently accurate measurement of object elevation angle to point the EO/IR system directly at the object in elevation then the EO/IR system needs to search for the radar object in elevation based on the 2d spatial information, range and azimuth, provided by the radar system.

Figure 8:
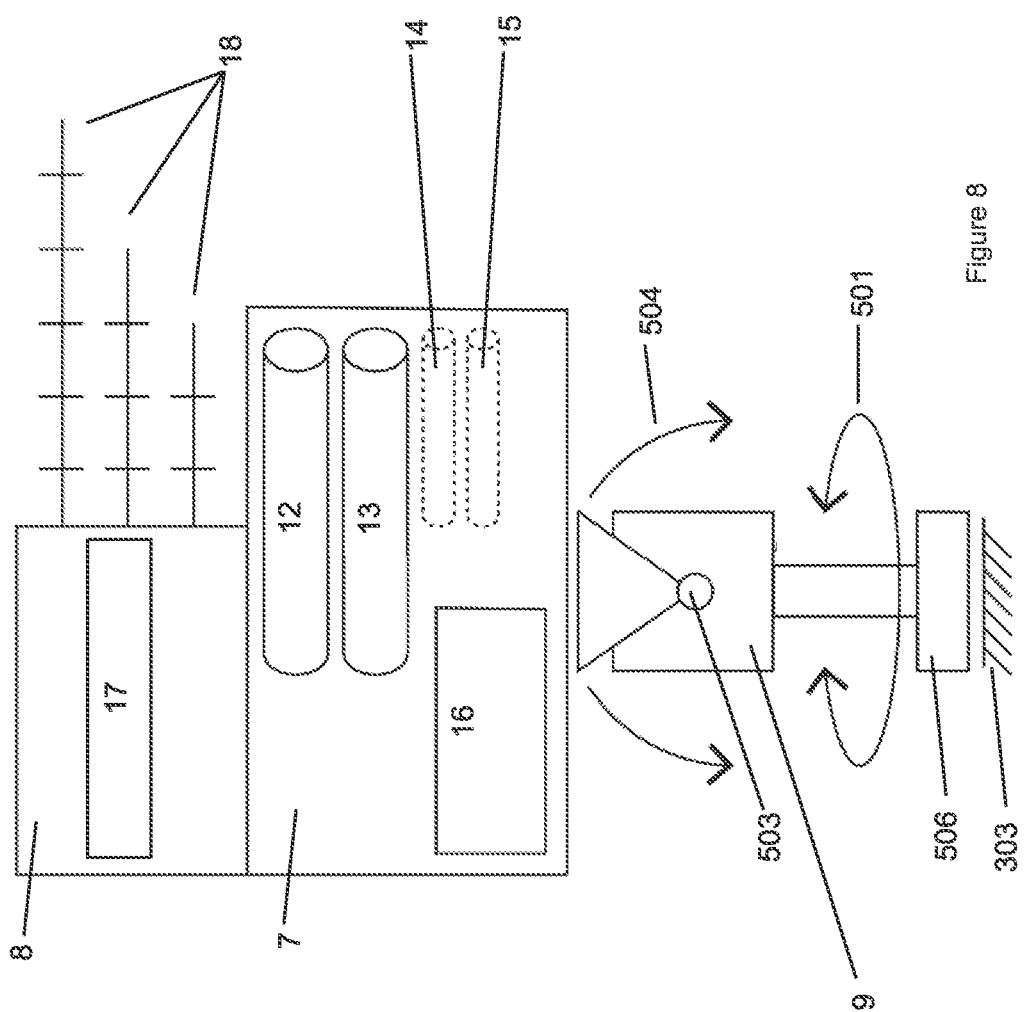
FIG. 8 is a diagrammatic representation of an EO/IR Jammer system.

To perform a spatial search either the system operator (human) or the EO/IR Jammer console 11 must select one or more of the available EO/IR cameras on the EO/IR jammer system. Referring to FIG. 8, the EO/IR jammer system comprises at least one imaging system, such as a daylight camera 13a or a Thermal Imager 13b. For example, a visible wavelength daylight camera 13a may be used during daylight and a Thermal Imager 13b camera system may be used at night.

A daylight camera 13a can view distant objects due to reflection of visible or near visible light off the object, the light coming from either the sun, moon, manmade lighting or other sources of illumination. For example, a directional illuminator 15 may be built into the EO/IR System 7.

A Thermal Imager 13b can view (create a video representation of the object being pointed at by the sensor) distant objects by detecting thermal emissions from the objects. Both cooled and uncooled thermal imaging cameras can be used, but for optimum detection ranges of small UAVs, cooled thermal imaging cameras may be preferable. Cameras and imaging systems sensitive to other wavelengths may also be used, including for example MWIR (Medium wavelength Infrared) cameras.

The EO/IR system 7 may also include a Laser Range Finder (LRF) 14 to measure the range from the LRF to the object. Examples of various EO/IR cameras and LRFs can be seen on the "Hawkeye system" from Chess Dynamics Ltd. www.chess-dynamics.com.

Having received object information from the radar system 1, the system console 3 initiates a spatial search for the object, based on the object information provided by the radar system 1, using the EO/IR system 7 on its Pan/Tilt Unit 9. Referring to FIG. 8, the pan/tilt unit 9 allows the EO/IR system 7 and the RF jammer system 8 to be tilted 504 about its horizontal axis 503, i.e. moved in elevation so that the EO/IR jammer system can point down to the ground or up into the air. The pan/tilt unit 9 may also be panned 501 about its vertical axis such that the EO/IR jammer system rotates horizontally about its base 506, which is attached to some suitable secure mounting point 303, for example on a building, mast or a vehicle.

Once an EO/IR camera selection has been made, the horizontal fields of view (HFOV—the effective angle subtended by the horizontal extent of the camera image) of each EO/IR system is preset to a value such that (i) it exceeds the variability in the measurement of object azimuth position on the radar, and (ii) it also provides sufficient magnification of the object for a video tracker unit 16 to detect and track the object at the pre-determined maximum range of engagement. The maximum range of engagement is the longest distance from the EO/IR system where it is expected that the EO/IR system will be able to detect and track a typical large UAV and beyond which no detection would be anticipated. For example, for a radar with azimuth measurement variability of +/−1 degree, the EO/IR camera HFOV should be set at a minimum of 2 degrees. However, for the video tracker to detect and track an object at the maximum range of engagement it may be sufficient to use a HFOV of 5 degrees. In that case, the EO/IR camera would scan a greater volume of sky compared to the 2 degree HFOV, thereby increasing the probability of detection by the EO system and reducing the object acquisition time.

Figure 9:
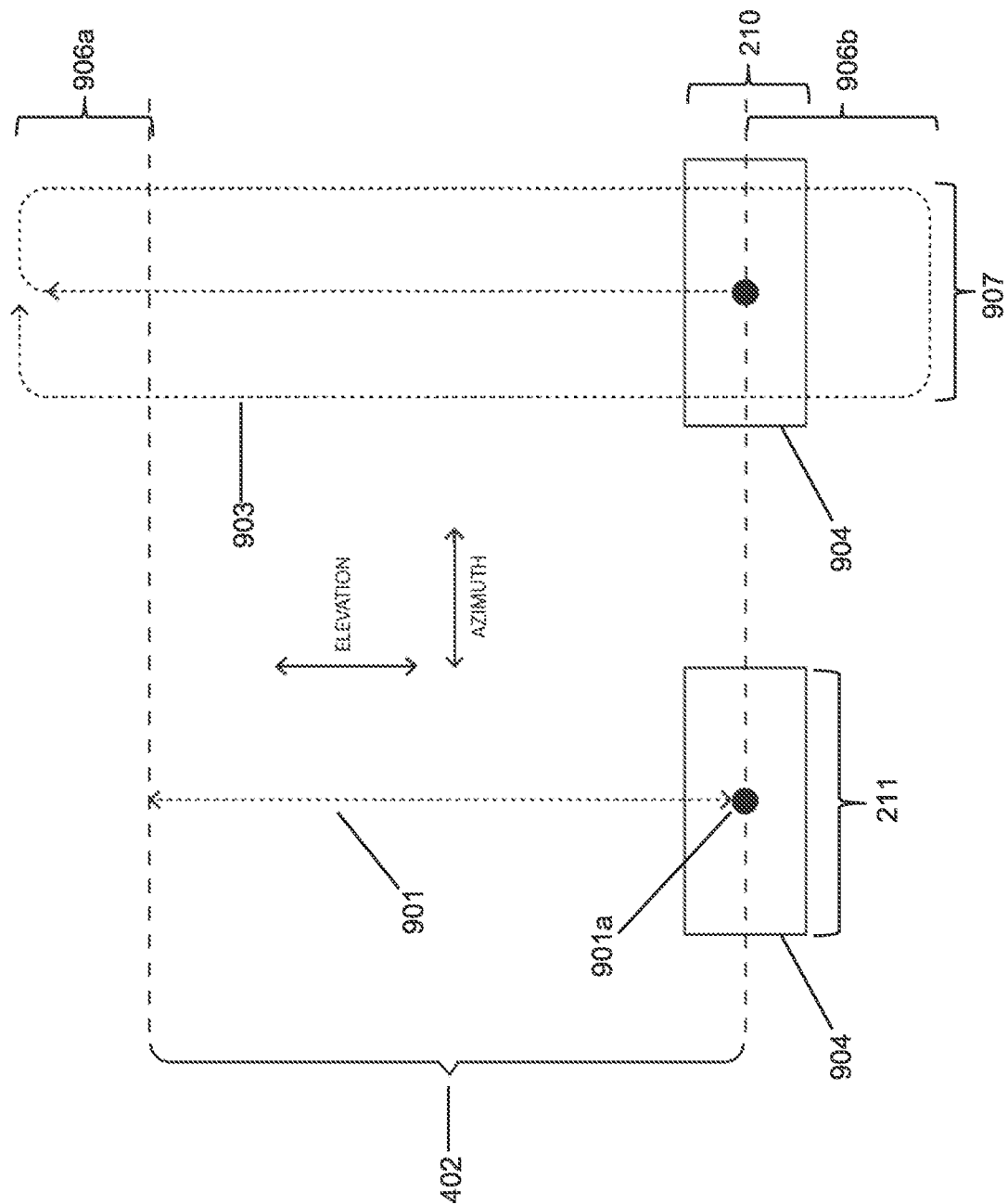
FIG. 9 is a diagrammatic representation of scanning by an EO/IR system.

The EO/IR Jammer Console 11 then initiates an EO/IR System 2 search for the object by controlling the Pan/Tilt unit 9 in azimuth and elevation (Pan & tilt) on which the EO/IR system 2 is mounted. Referring to FIGS. 5 and 6, as the object is more likely to be at the range 404 and azimuth position 401 calculated by the radar system 1 and within the radar object elevation window 402 of the Radar unit. Referring to FIG. 9, the EO/IR jammer console 11 commands the Pan/tilt unit 9 to move the EO/IR System 7 so that it scans a vertical line 901 starting at the given azimuth position 401 and from one end of the radar object elevation window 402, for example 901*a*, through to the other end of the radar object elevation window 402. If no object is detected within the EO/IR video window 904 by the video tracker unit 16 then the EO/IR Jammer console 11 reverses the direction of the scan 901 and searches again. This up and down scan pattern may continue for as long as either the EO/IR Jammer console 11 or the operator decides.

During the EO/IR System scan the azimuth position 401 may be updated by more recent radar system object updates. Depending on both the radar characteristics and the EO/IR camera characteristics, the EO/IR Jammer console 11 may use a modified scan 903 to increase the volume of the sky being searched. For example it may be possible for the radar to detect a very large object (an object having a large radar cross sectional area capable of being detected on the radar unit's elevation beam sidelobes) outside of the main elevation beamwidth 202 and in one the radar antenna's elevation sidelobes. In this instance the extended elevation scan angle 906*a*, 906*b* would be increased to cover the extended sidelobe region of the radar. Equally the azimuth scan angle 907 of the EO/IR System could be extended in either direction to accommodate positional measurement or prediction errors within the radar system. In such a case, a modified scan 903 with the vertical search in one direction being set at one limit of azimuth and the return search in the other direction set at the other limit of the azimuth angle would allow the EO/IR video window 904 to search a greater volume of the sky. Other search patterns could also be used depending on the characteristics of the radar, EO/IR camera systems and the type of object anticipated. For example, if fast moving objects are anticipated then the volumetric search pattern may need to be extended to allow for object manoeuvres which result in non-linear object motion and the exaggeration of system measurement errors of fast objects resulting from sensor and processing latency.

Once the video tracker unit has detected a potential object within a single video frame (one complete image acquisition period) on any of the EO/IR cameras 12, it searches, on the subsequent video frames, for additional detections of the object in the vicinity of the first detection allowing for sensor movement and object manoeuvres. The video tracker unit may determine whether the same object can be detected on a predefined percentage of the number of subsequent video frames. This object detection correlation process reduces the probability of falsely initiating a video track on sporadic EO/IR camera detections or video noise.

Figure 10:
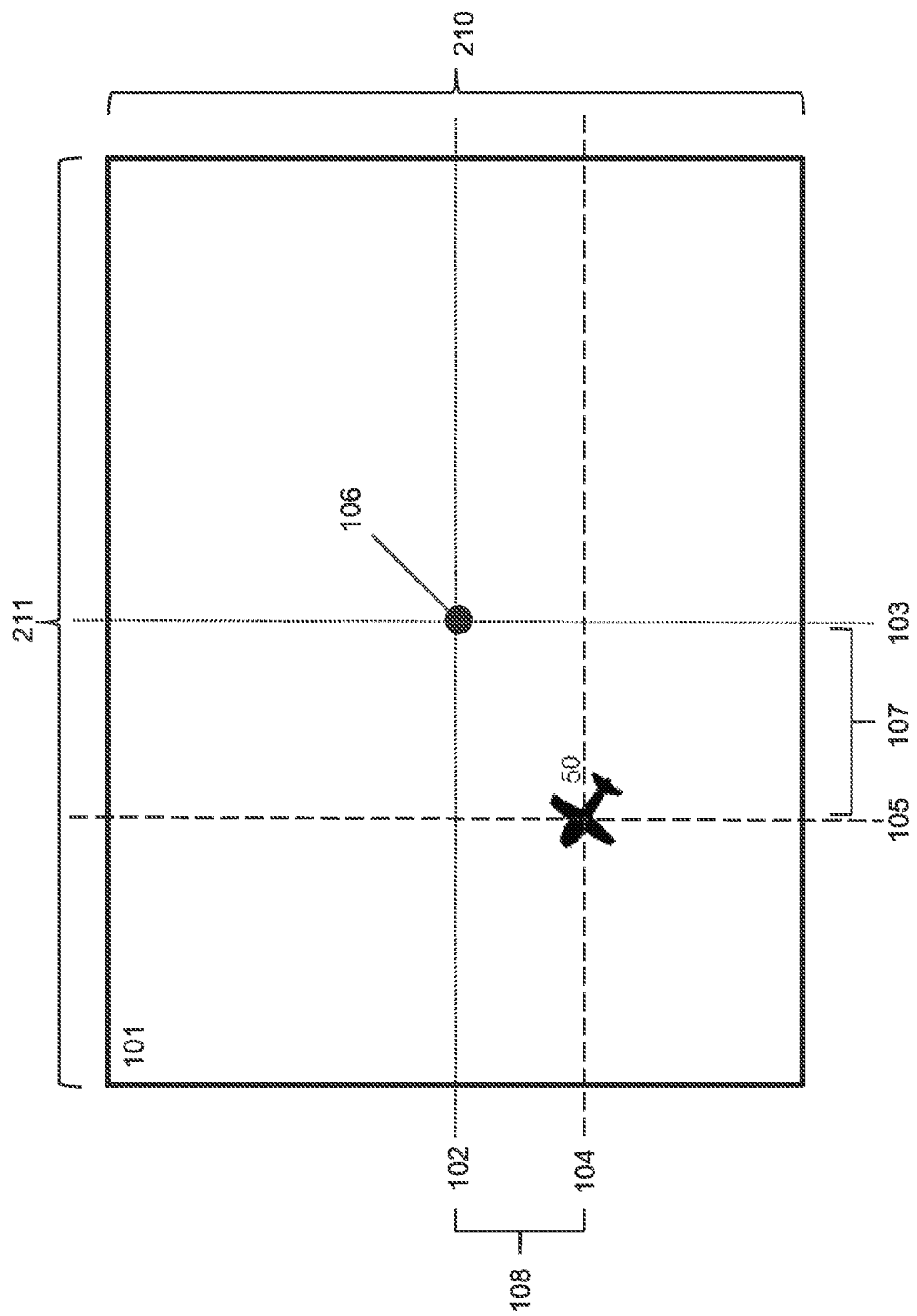
FIG. 10 is a diagrammatic representation of measuring the position of an acquired object.

Referring for FIG. 10, once the object is acquired (i.e. the video tracker has detected the object on sufficient video frames that it considers the detected object to be a candidate for continuing the video tracking process) the video tracker unit measures the object position 104 (vertical) and 105 (horizontal) within the video frame 101 to allow the angular offset of the EO system to be calculated.

The object horizontal video offset 107 from video boresight 106 is the difference between object horizontal position 105 and video horizontal boresight 103. The object vertical video offset 108 from video boresight 106 is the difference between object vertical position 104 and video vertical boresight 102. Knowing the angular offset of the object within the video frame (which is easily derived from the horizontal and vertical video offsets 107 and 108 within known horizontal and vertical fields of view 211 and 210) and the absolute position of the EO/IR camera system on the Pan/Tilt unit allows the EO Jammer console to calculate the absolute angular position of the object in both azimuth and elevation with respect to the base of the Pan/Tilt unit, which is likely to be mounted on a known ground position reference. Note that the EO/IR camera system is not inherently capable of measuring range to the object.

In an alternative example, a more sophisticated velocity based tracking system may be used. An example of this is a proportional-integral-derivative controller (PID controller) which is a control loop feedback mechanism (controller) widely used in industrial control systems (for example the "DART Embedded Target Tracking Software" from Vision4ce Ltd. www.vision4ce.com). The coefficients within the PID controller are selected to provide zero error when tracking a target with constant angular velocity.

Once the video tracker unit has acquired the object, it sends the object azimuth and elevation offsets 107 and 108 to the Pan/tilt unit 9. This allows the video tracker unit to optimally place the object on the video frame 101 and to maintain it there by constantly tracking the object, measuring its position and/or motion and feeding positional offsets to the Pan/Tilt unit on a time interval that is typically a video frame update period. Note that this time interval will depend on the implementation of the video tracker unit and may require multiple video frame update periods in some instances. The process described beforehand is commonly referred to as closed-loop video tracking.

As described above, when the video tracker unit 16 is tracking the object, the object's elevation angle with respect to the ground is accurately known (refer to FIG. 4 item 304). This elevation angle can be passed back from the EO/IR jammer console 11 to the Radar Console 10 to enable the radar console to optimally change the tilt angle of the radar tilting unit 6. Normally the radar tilting unit 6 will tilt the radar such that the elevation boresight angle 305 is set to the measured object elevation angle, however, if the object is close to the ground then a minimum elevation limit (minimum tilt angle) may be set to prevent the radar from being tilted too low thereby preventing the radar transmission from illuminating too much of the ground. This minimum radar tilt angle ensures that ground clutter reflections and ground based object detections are reduced within the radar unit, which prevents unwanted information being presented to the operator on the radar control console 20.

When the video tracker unit 16 is tracking an object, the object's azimuth position on the EO/IR camera or cameras can be validated with the object's azimuth position from the unit radar. If the radar and camera azimuth angles do not agree, within tolerances defined by radar positional measurement errors, camera positional measurement errors and object dynamics and other systematic positional errors, then the EO/IR Jammer console can either stop tracking the object and/or alert the operator so that he can decide how to react to what the EO/IR jammer console believes to be mismatched radar and video objects (i.e. the object being tracked by the radar tracker is not the same as the object being tracked by the video tracker unit).

Assuming that the radar tracker and video tracker unit are both tracking the same object then the information on that same object from both the radar unit and the EO/IR system may be combined to improve the object location accuracy and provide both the EO/IR Jammer console and the operator with better object information. The EO/IR Jammer Console is able to use the combined object information from the radar unit and the EO/IR system to classify the object. Classification is the process of identifying unique or common characteristics of different type of objects. For example, by combining radar object azimuth position and range with EO/IR system object azimuth and elevation position, the location of the object in three-dimensional (3D) space can be determined, i.e. Range, azimuth and elevation. Additionally, knowing the exact 3D location and the object's radar cross sectional area (radar object size), and EO/IR camera object size in horizontal and vertical pixels, plus additional object dynamic information such as ground speed and heading can allow the object to be classified. For example, it may be possible to automatically identify (classify) the make and model of a specific UAV by analysing its radar range and RCS, video dimensions (EO/IR object size), and speed. Knowledge of the object type can allow the operator to assess the threat posed by that UAV, or other air object. The use of object classification may allow for improved safety as the EO/IR jammer console should be able to warn the operator if the tracked object appears to have the characteristics of, for example, a manned helicopter or manned aircraft.

Referring back to FIG. 8, when the object is being video tracked, an RF Jammer System 8 (for example the "Kestrel jamming system" from Enterprise Control Systems www.enterprisecontrol.co.uk) co-located on the same Pan/Tilt unit 9 as the EO/IR system 7, or in an alternative embodiment, mounted on a separate Pan/Tilt unit but controlled by the same EO/IR jammer console, can be pointed towards the same object. This allows the directional antennas 18 on the RF Jammer System 8 to optimally point towards the object to maximise the amount of jamming energy that may be transmitted towards the object.

The RF Jammer system 8 is configured to produce high power radio transmissions at either single frequencies or over a range of frequencies (spectra). The RF Jammer may, for example, use three different spectra, each relating to key wireless communication channels typically used by UAVs. In the described system, the spectra include: the GNSS L-Band wireless link, the UAV control data link channels and the UAV WiFi data link channels, these communications channels are described in more detail later). Other channels could include other UAV control uplink channels and other video and UAV status downlink channels. The aim of jamming the control and information wireless channels on the UAV is to deny control of the UAV to the original UAV operator(s) and to instead enable some level of control of the UAV to the Counter-UAV system operator.

Figure 11:
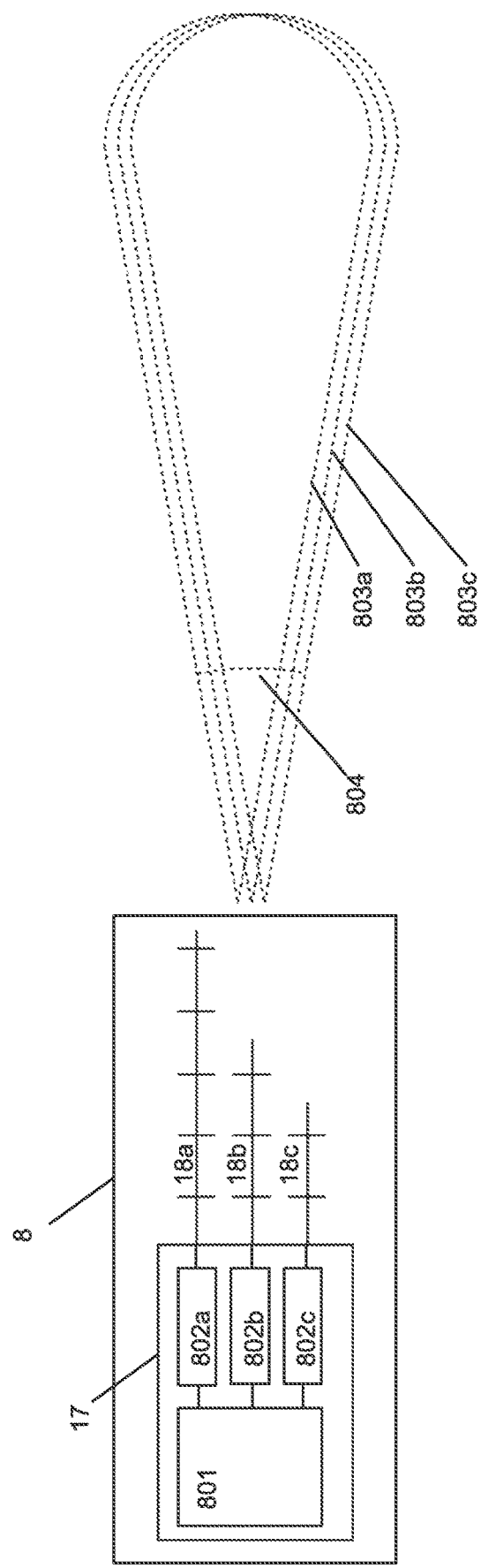
FIG. 11 is a diagrammatic representation of an RF Jammer system.

Referring to FIG. 11, the RF Jammer system 8 comprises an RF Jammer unit 17 capable of producing a multitude of RF jamming spectra at high power levels and antenna system comprising one or more, for example three, directional antennas 18a, 18b, 18c through which the RF jamming signals are broadcast. The RF Jammer unit comprises a waveform generator 801 that generates the required spectra and a series of power amplifiers, 802a, 802b, 802c that amplify the outputs of the waveform generator 801 to provide the high power transmissions for each unique spectra. The radio frequency power generated by each power amplifier depends on the system design and especially the radiated power required to exceed the radio transmission power being received by the UAV from the UAV operator(s) or other communication channels, especially if the UAV operator is using directional wireless communication links. A power amplifier RF transmission power of between 1 Watt and 50 Watts may be used.

The directional antennas 18 within the antenna system ensure that as much RF power is sent in the direction of the object as practically possible, while minimising the amount of RF power being broadcast in the remaining space (outside of the main antenna beam). The directional antennas are designed to produce a transmission beamwidth 804 (the angle over which the power is not less than 3 dB below the peak power) that is practical for deployment on the pan/tilt unit. A typical antenna beamwidth of between 5 degrees up to 40 degrees may be used and may be the same on both azimuth and elevation, though in other examples the beamwidth may be different in azimuth and elevation, for example to reduce the effect of the jamming system on the ground. Narrow beamwidths require physically large antennas so the minimum beamwidth may limited by the maximum size of antenna. For example, a more compact antenna may require use of a wider beamwidth.

All the directional antennas may have similar beamwidths so that the effectiveness of the RF jammer system is consistent across all spectra being used. Note how the directional antennas 18a, 18b & 18c produce a series of transmission beams 803a, 803b, 803c that are nominally similar in shape and point in the same direction. Antennas with dissimilar beamwidths and directions may also be used depending on the jamming requirements and antenna physical design. Reducing the residual jamming power outside of the main transmission beam reduces the risk of other local services that use the same RF spectra from being jammed also. For example, jamming the GNSS channel might stop local GPS based products from working, including Satellite navigation systems and other communication services that use precise GPS time references.

Figure 12:
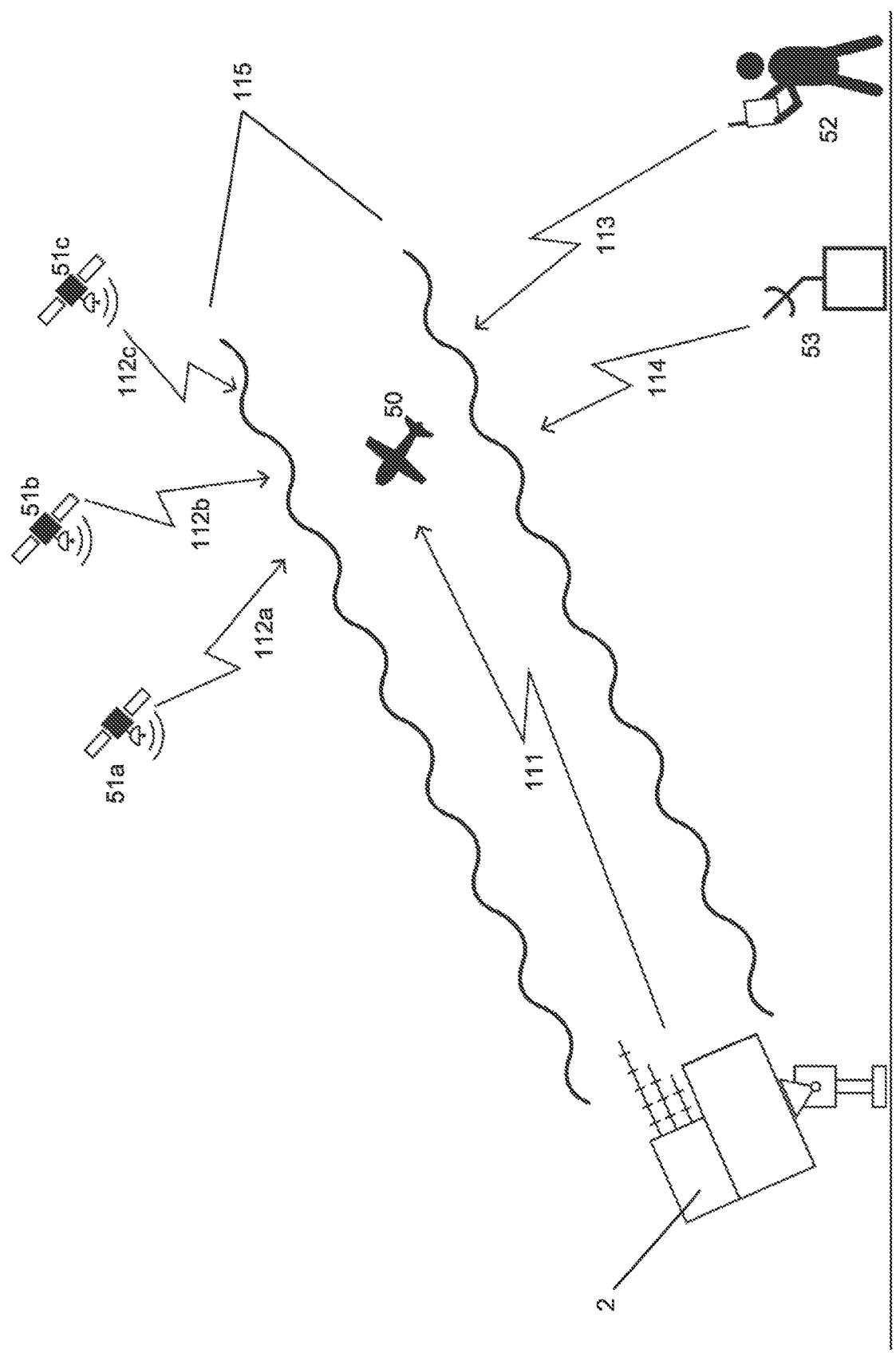
FIG. 12 is a diagrammatic representation of an RF Jammer system disrupting RF communications of an object.

Referring to FIG. 12, the RF Jammer system 8 operates by over powering the radio frequency transmissions received by the UAV 50 from remote sources. The RF Jammer system prevents the UAV from receiving commands and positional information from the external sources by transmitting radio frequency energy along its jamming RF link 111 within the same spectra as used by the UAV receiver channels and with sufficient radiated power to exceed the power from the intended external transmission sources. These intended external sources include: the control data link 113 (example in UK 458.5 MHz to 459.5 MHz) from the remote control transmitter 52 used by the UAV ground pilot, the WiFi bi-directional data link 114 (example 2.4 GHz or 3.5 GHz or 5.8 GHz WiFi spectra) used by the UAV programming unit 53, and the GNSS L-Band wireless broadcast 112 (example 1164 MHz to 1610 MHz) from the Global Navigation Satellite System (GNSS) satellite constellation 51, which include the American Global Positioning System (GPS) and the Russian GLONASS satellite systems.

Reference number 115 in FIG. 12 denotes a notional cylinder in space with its long axis along the boresight of the directional antennas within which the RF Jammer System can successfully jam the UAV communications channels. The edge of the cylinder may be vague or not defined sharply (depicted by a wavy line) due to the variations in the effectiveness of the RF jammer system with respect to the UAV's external wireless communications channels.

It is possible for UAVs to use a diverse range of communications channels and therefore the three spectra described above are examples of what may be used. For example, it is common for the control datalink channel 113 to vary according to country, due to spectrum usage regulations. Equally there is no reason why the UAV operator might not choose a completely non-standard frequency or spectra by which to communicate with the UAV. A number of new GNSS networks are also due to start operating in future years including the European Galileo satellite navigation system, which will use other channels within the GNSS L-Band spectrum. In some countries it is illegal to interfere with GNSS transmissions and other transmissions and therefore permissions should be sought before doing so.

While the UAV or other object is being tracked by both the radar system and the video tracker unit, the EO/IR Jammer Console has knowledge of the 3D position of that object in the air, including the range from RF Jammer System to the object. Beyond a pre-determined range defined by the likely ERP (Effective Radiated Power) of the remote UAV wireless communications channels and the ERP of the local RF Jammer system, the RF Jammer system may not be effective, and therefore, the EO/IR Jammer console may inhibit the use of the RF Jammer system until the object is at a range, the maximum jamming range, where the object is most likely to be disrupted by the RF Jammer. Early use of the RF Jammer system may disclose to the UAV operators the characteristics of the RF Jammer system, enabling them to design counter-measures. For example, if the RF jammer system was transmitting continuously then the UAV operator could continue to fly the UAV until the point where control of the UAV was lost. This point would provide useful information about the relative jammer powers being used compared to the UAV control uplinks. Alternatively, if the RF Jammer system is deployed only when UAV denial is almost certain then the UAV operator will gain little knowledge of the RF Jammer system.

The example RF Jammer system includes three unique spectra selected to deny the UAV access to its primary GNSS L-band wireless broadcast 112, control data link 113 and WiFi bidirectional data link 114 channels. Other spectra may be used depending on UAV characteristics and the evolving counter measures used by the UAV operator. For example, it may be found that just one radio channel will successfully prevent a UAV from completing its mission on the first attempt, but in time, additional and diverse control channels and intelligent on-board navigation systems may be used to prevent jamming, requiring more RF Jamming spectra to be used and with more elaborate waveforms to interfere with more complex wireless communication links, for example spread spectrum wireless communication links.

When the EO/IR System is tracking the object and the object range as measured by the radar system or other sensors (e.g. Laser Range Finder—LRF) is less than the maximum jamming range, then the EO/IR Jammer console may either automatically or under the control of the operator enable one or more RF Jamming spectra. One, all or some of the available RF Jamming spectra may be used, with the remaining spectra being enabled only if required. For example, in an urban location, it may be undesirable to use the GNSS spectra due to collateral inhibition of other systems, so the control data link or WiFi bi-directional data link spectra may be tried first. If they do not appear to alter the behaviour of the UAV then the GNSS channel jamming may be enabled. This decision process could be automated by the EO/IR jammer console or be made by the Counter-UAV system operator.

The RF Jamming transmissions from the RF jammer system may be applied for as long it is felt necessary to take control of the UAV, which could range from seconds to many minutes. One effect of RF jamming may be to make the UAV start to fall to the ground within seconds due to its loss of positional awareness (e.g. no GNSS channel). Alternatively, a jammed UAV may simply fly to or between pre-programmed waypoints (specific 3D spatial positions) waiting for a new instruction over its jammed control data link or WiFi bidirectional data link channels. In this instance the UAV would eventually run out of battery power or fuel and fall to the ground.

The effect of RF jamming is dependent on the type of communication channel being jammed and the way in which the UAV's computer software is programmed to operate. Denial of the GNSS channel is generally very effective at preventing the UAV from knowing where it is, though onboard inertial navigation systems can determine its location and heading for a period of time after GNSS is denied. The effect of jamming the UAV control uplink channels is more unpredictable as the UAV may already be pre-programmed with waypoint information meaning that denial of the use of the channel(s) is of no benefit unless the jamming signal can itself spoof typical control commands. The RF Jammer system may be configured to send alternative commands to the UAV telling it, for example, to land in a different location where no harm can be done and the UAV retrieved safely.

Figure 15:
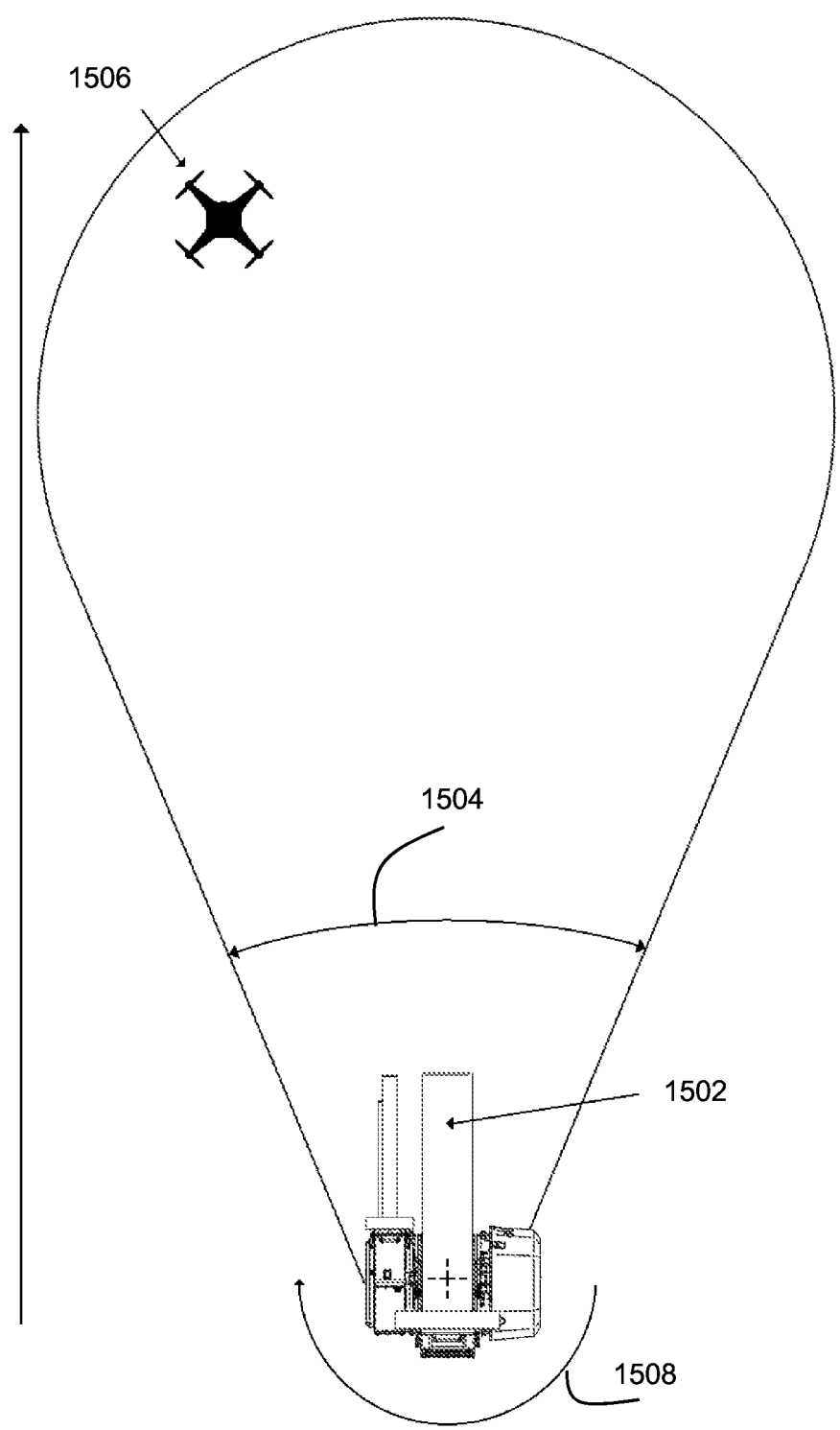
FIG. 15 depicts a plan view of an embodiment in which an RF inhibitor is continuously rotated about an axis.

FIG. 15 shows a plan view of an embodiment of an RF Inhibitor capable of continuous rotational movement. The continuous rotation is used to defeat a "swarm" of unmanned aircraft. A swarm is a group of at least two unmanned aircraft.

The RF Inhibitor has an antenna 1502 with a half power (3 dB) beam width 1504 of x degrees. As the RF Inhibitor rotates at a continuous speed, each unmanned aircraft 1506 over which the beam sweeps has its RF communications inhibited, or disrupted, for a proportion of each revolution as follows.

$$\text{Inhibition for } \frac{x}{360} \times 2\pi \text{ radians} \quad \text{(Equation 1)}$$

$$\text{No inhibition for } \frac{(360-x)}{360} \times 2\pi \text{ radians} \quad \text{(Equation 2)}$$

The time for an unmanned aircraft communication system to re-establish itself on an ISM band and for the autopilot to settle afterwards has been measured as 0.5 seconds. Thus, the rotational speed 1508, y, to be effective at inhibiting communication systems on the ISM band, is:

$$y = \frac{(360-x)}{360 \times 0.5} \times 2\pi \text{ radians/second} \quad \text{(Equation 3)}$$

The time for an unmanned aircraft GNSS system to reacquire lock and settle has been measured as 5 seconds. Thus, the rotational speed y', to be effective at inhibiting GNSS systems is:

$$y' = \frac{(360-x)}{360 \times 5} \times 2\pi \text{ radians/second} \quad \text{(Equation 4)}$$

Thus, for a 20° half power beam width antenna, the speed range y to y' for these two scenarios would be 1.18 to 11.8 radians/second. This corresponds to an inhibition period (where the unmanned aircraft is irradiated by the radiation) of around 0.03 to 0.3 second and a period without inhibition (where the unmanned aircraft if not irradiated by radiation) of 0.5 to 5 seconds.

Continuous rotation about an axis with a constant speed can therefore be effective against swarms of unmanned aircraft. In this embodiment no particular targeting equipment is required, which reduce the cost of the system. For example, the system may be set in constant operation to protect an area from unmanned aircraft flights.

Some embodiments may include detection and/or tracking systems as described above with reference to FIGS. 1 to 12. In one example, the continuous rotation mode may be activated only when multiple unmanned aircraft are detected. In another example, the continuous rotation mode may be active, but the RF inhibition signal only generated with one or more unmanned aircraft are detected. This may reduce the risk of inhibiting desired RF communication by other devices within the area swept by the antenna.

Other embodiments may provide continuous rotation of the directional antenna at all times, to act as a visual deterrent. However, the transmitter may only be turned on when the detection system detects an unmanned aircraft.

Although the use of intermittent irradiation has been described above as used to defeat a plurality of unmanned aircraft, it may be applied to defeating a single aircraft in other embodiments. When a single unmanned aircraft is targeted as described above with reference to FIGS. 1 to 12, intermittent operation may also be used, which could provide power saving over continuous emission.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A system for disrupting Radio Frequency communication of a plurality of unmanned aircraft, the system comprising:
   a directional antenna;
   a transmitter to generate a signal waveform for emission by the directional antenna, the signal waveform configured to disrupt Radio Frequency communication of an unmanned aircraft;
   a drive system connected to the directional antenna and configured to move the directional antenna about an axis; and
   a control system operatively connected to the transmitter and the drive system;
   wherein the control system is configured to:
      cause the transmitter to generate the signal waveform; and
      cause the drive system to rotate the directional antenna about the axis continuously in a same rotational direction such that electromagnetic radiation emitted by the directional antenna irradiates each of the plurality of unmanned aircraft intermittently, wherein each of the plurality of unmanned aircraft is irradiated for a first period of time and not irradiated for a second period of time, and wherein the second period of time is less than or equal to 5 seconds.

2. The system of claim 1 wherein the electromagnetic radiation emitted comprises a GNSS frequency.

3. The system of claim 1, wherein the electromagnetic radiation emitted comprises an ISM frequency and the second period of time is less than or equal to 0.5 seconds.

4. The system of claim 1, wherein the drive system is configured to rotate the directional antenna about the axis at a speed of at least 1 rad/s.

5. The system of claim 1, further comprising:
   a detection system configured to detect unmanned aircraft;
   wherein the control system is configured to cause the drive system to move a beam emitted by the directional antenna over an area including at least two unmanned aircraft detected by the detection system.

6. The system of claim 5, wherein control system is configured to vary the speed at which the drive system moves the directional antenna in dependence on detected unmanned aircraft within a beam of electromagnetic radiation emitted by the directional antenna.

7. The system of claim 6, wherein the control system is configured to cause the drive system to decrease the speed at which the directional antenna moves when an unmanned aircraft is detected within the beam of electromagnetic radiation emitted by the directional antenna.

8. The system of claim 6, wherein the control system is configured to cause the drive system to increase the speed at which the directional antenna moves when no unmanned aircraft is detected within the beam of electromagnetic radiation emitted by the directional antenna.

9. The system of claim 1, further comprising:
a tracking system operatively connected to the drive system and the control system, the tracking system for tracking an unmanned aircraft detected by the a detection system;
wherein the control system is configured to:
cause the tracking system to track a single unmanned aircraft, responsive to a single unmanned aircraft being detected by the detection system; and
cause the drive system to move a beam of electromagnetic radiation emitted by the directional antenna across an area including at least two unmanned aircraft, responsive to two or more unmanned aircraft being detected by the detection system.

10. A method of disrupting a radio frequency communication system of one or more unmanned aircraft using a same source of electromagnetic radiation, the method comprising:
irradiating each of the one or more unmanned aircraft with a burst of electromagnetic radiation using the same source of electromagnetic radiation; and
repeating the irradiating each of the one or more unmanned aircraft with a burst of electromagnetic radiation by rotating the source of electromagnetic radiation about an axis continuously in a same rotational direction such that all of the one or more unmanned aircraft are irradiated at least once every 5 seconds.

11. The method of claim 10, wherein the burst of electromagnetic radiation comprises a GNSS frequency.

12. The method of claim 10, wherein the burst of electromagnetic radiation comprises an ISM frequency, and the irradiating is repeated such that all of the one or more unmanned aircraft are irradiated at least once every 0.5 seconds.

13. The method of claim 10, wherein the irradiating and repeating are responsive to detection of one or more unmanned aircraft.

14. A non-transitory computer-readable medium comprising computer-readable instructions for execution by a processor of a system for disrupting radio frequency communication of unmanned aircraft, the system comprising: a directional antenna; a transmitter to generate a signal waveform for emission by the directional antenna; and a drive system connected to the directional antenna and configured to move the directional antenna;
wherein the computing readable instructions, when executed by the processor, cause the processor to:
cause the transmitter to generate the signal waveform, the signal waveform configured to disrupt Radio Frequency communication of an unmanned aircraft; and
cause the drive system to rotate the directional antenna about an axis continuously in a same rotational direction such that electromagnetic radiation emitted by the directional antenna irradiates each of a plurality of unmanned aircraft intermittently, wherein each of the plurality of unmanned aircraft is irradiated for a first period of time and not irradiated for a second period of time, and wherein the second period of time is less than or equal to 5 seconds.

15. The non-transitory computer-readable medium of claim 14, wherein the computer-readable instructions, when executed by the processor, cause the processor to:
cause the transmitter to generate the signal waveform comprising an ISM frequency; and
cause the drive system to move the directional antenna such that the second period of time is less than or equal to 0.5 seconds.

16. The non-transitory computer-readable medium of claim 14, wherein the computer-readable instructions, when executed by the processor, cause the processor to:
cause the drive system to vary the speed at which the directional antenna moves in dependence on detected unmanned aircraft within a beam of electromagnetic radiation emitted by the directional antenna.

17. The non-transitory computer-readable medium of claim 16, wherein the computer-readable instructions, when executed by the processor, cause the processor to:
cause the drive system to move the directional antenna at a first speed when an unmanned aircraft is detected within the beam of electromagnetic radiation emitted by the directional antenna; and
cause the drive system to move the directional antenna at a second speed when no unmanned aircraft is detected within the beam of electromagnetic radiation emitted by the directional antenna, wherein the second speed is faster than the first speed.

* * * * *